United States Patent
Carlson (10) Patent No.: US 10,997,077 B2
(45) Date of Patent: May 4, 2021

(54) INCREASING THE LOOKAHEAD AMOUNT FOR PREFETCHING

(71) Applicant: Cavium, LLC, Santa Clara, CA (US)

(72) Inventor: David Carlson, Haslet, TX (US)

(73) Assignee: Marvell Asia Pte, Ltd., Singapore (SG)

( * ) Notice: Subject to any disclaimer, the term of this patent is extended or adjusted under 35 U.S.C. 154(b) by 138 days.

(21) Appl. No.: 16/199,936

(22) Filed: Nov. 26, 2018

(65) Prior Publication Data

US 2020/0167286 A1 May 28, 2020

(51) Int. Cl.
*G06F 12/0862* (2016.01)
*G06F 12/02* (2006.01)
*G06F 12/1009* (2016.01)

(52) U.S. Cl.
CPC ...... *G06F 12/0862* (2013.01); *G06F 12/0215* (2013.01); *G06F 12/1009* (2013.01); *G06F 2212/6026* (2013.01)

(58) Field of Classification Search
CPC .... G06F 3/0622; G06F 3/0637; G06F 3/0659; G06F 3/0683; G06F 9/3004; G06F 9/3005; G06F 12/0804; G06F 2212/1052; G06F 2212/602–6028
See application file for complete search history.

(56) References Cited

U.S. PATENT DOCUMENTS

| | | | | |
|---|---|---|---|---|
| 7,177,985 B1 * | 2/2007 | Diefendorff | ........ | G06F 12/0862 711/118 |
| 7,350,029 B2 * | 3/2008 | Fluhr | ................. | G06F 12/0862 711/100 |
| 2004/0205298 A1 * | 10/2004 | Bearden | ............. | G06F 12/0862 711/137 |
| 2014/0149668 A1 * | 5/2014 | Chaudhary | ......... | G06F 12/0862 711/119 |
| 2015/0067276 A1 * | 3/2015 | Mito | ..................... | G06F 3/0611 711/151 |
| 2015/0134933 A1 * | 5/2015 | Holm | ...................... | G06F 9/383 712/207 |
| 2015/0143057 A1 * | 5/2015 | Pavlou | .................... | G06F 12/02 711/137 |

* cited by examiner

*Primary Examiner* — Charles Rones
*Assistant Examiner* — Hewy H Li (57) ABSTRACT

A data structure (e.g., a table) stores a listing of prefetches. Each entry in the data structure includes a respective virtual address and a respective prefetch stride for a corresponding prefetch. If the virtual address of a memory request (e.g., a request to load or fetch data) matches an entry in the data structure, then the value of a counter associated with that entry is incremented. If the value of the counter satisfies a threshold, then the lookahead amount associated with the memory request is increased.

20 Claims, 4 Drawing Sheets

| 300 | VIRTUAL ADDRESS | PREFETCH STRIDE | COUNTER VALUE | LOOKAHEAD AMOUNT |
|---|---|---|---|---|
|  |  |  | 1 | 1 |
| 302 → | B1 | SB | 1 | 1 |
| 303 → | C1 | SC | 1 | 1 |
|  | Etc. | Etc. | Etc. | Etc. |

FIG. 3B

| 300 | VIRTUAL ADDRESS | PREFETCH STRIDE | COUNTER VALUE | LOOKAHEAD AMOUNT |
|---|---|---|---|---|
| 301 → | A2 | SA | 1 | 1 |
| 302 → | B1 | SB | 1 | 1 |
| 303 → | C1 | SC | 1 | 1 |
|  | Etc. | Etc. | Etc. | Etc. |

FIG. 3C

| 300 | VIRTUAL ADDRESS | PREFETCH STRIDE | COUNTER VALUE | LOOKAHEAD AMOUNT |
|---|---|---|---|---|
| 301 → | A3 | SA | 2 | 1 |
| 302 → | B1 | SB | 1 | 1 |
| 303 → | C1 | SC | 1 | 1 |
|  | Etc. | Etc. | Etc. | Etc. |

FIG. 3D

| 300 | VIRTUAL ADDRESS | PREFETCH STRIDE | COUNTER VALUE | LOOKAHEAD AMOUNT |
|---|---|---|---|---|
| 301 → | A3 | SA | 3 | 2 |
| 302 → | B1 | SB | 1 | 1 |
| 303 → | C1 | SC | 1 | 1 |
|  | Etc. | Etc. | Etc. | Etc. |

FIG. 4

INCREASING THE LOOKAHEAD AMOUNT FOR PREFETCHING

BACKGROUND

A primary factor in the utility of a computer system is the speed at which the computer system can execute an application. It is important to have data available when it is needed, to prevent the computer system from idling or stalling while it waits for data to be accessed from memory.

A widely used solution to reduce memory access latency and prevent stalling in a processor is to implement a hierarchy of caches in the computer system. In essence, one or more caches are situated between the main memory and the processor. The cache closest to the processor is usually referred to as the level one (L1) or lowest level cache, the next cache is usually referred to as the level two (L2) or higher level cache, and so on, with the cache that is closest to the main memory referred to as the highest level cache. The caches store recently used data based on the assumption that data might be needed again. By storing data in a hierarchical manner, the caches can reduce latency and prevent stalling by providing the data more rapidly than if the data had to be retrieved from, for example, the main memory.

Latency can be further reduced by prefetching information into the caches from higher level memory. In essence, prefetching involves making a prediction of the data that may be needed by an application, and then fetching that data from, for example, the main memory into any one of the caches, or from a higher level cache into a lower level cache (e.g., from the L2 cache to the L1 cache). The predicting, fetching, and storing described above are performed opportunistically, e.g., before the data is actually requested by the application.

A conventional prefetcher monitors a stream of requests for data and looks for a pattern in the addresses associated with those requests. If a pattern can be found, then that pattern can be used to anticipate subsequent requests for data, so that data can be prefetched. For example, if the prefetcher determines that every other cache line in the L2 cache is being requested in response to a cache miss in the L1 cache, then the prefetcher can predict which cache line in the L2 cache will be requested next and can fetch that cache line before the request is made.

A prefetch stride may be associated with a prefetch request. The prefetch stride refers to the distance between addresses in the pattern. If, for example, a first memory request includes address A1, and a second memory request includes address A2 (and if those addresses are part of a pattern), then the prefetch stride is the difference between the addresses A1 and A2.

A prefetch distance or lookahead amount may also be associated with a prefetch request. For example, instead of prefetching a single cache line in a pattern, the prefetcher may prefetch the next two cache lines in the pattern. The prefetch distance or lookahead amount refers to the number of cache lines that are prefetched per prefetch request.

However, some software (instruction) loops execute fast enough that prefetching only one or two cache lines is not sufficient to account for the access latency from higher level memory. Thus, in some instances, a larger lookahead amount would be beneficial to hide memory latency. On the other hand, smaller loops may not need a larger lookahead amount and/or a larger lookahead amount might result in the prefetching of data that are not needed, thereby reducing computer system performance by, for example, consuming bandwidth and processor cycles retrieving data that will not be used. Also, the space available in a cache is limited, and so including unneeded data in a cache may mean that there is not enough space in the cache for data that are needed.

SUMMARY

Embodiments according to the present invention provide methods of prefetching data, and systems that implement such methods, that resolve the issues described above.

More specifically, in embodiments according to the present invention, adaptive prefetching is introduced, during which the lookahead amount is intelligently adjusted (e.g., increased) when it is beneficial to do so, such that the lookahead amount is not too small. Also, the amount of increase is managed, so that the lookahead amount does not get too large. Accordingly, the lookahead amount can be smaller for shorter software loops and larger for longer software loops.

In general, a load instruction in an executing application can generate multiple memory requests (e.g., a request to load or fetch data) to different addresses (virtual addresses) in memory. In embodiments according to the present invention, a data structure (e.g., a table) stores a listing of prefetches (e.g., active prefetches). Each entry in the data structure includes a respective virtual address and a respective prefetch stride. If an entry in the data structure matches a virtual address (which may be referred to herein as a "second virtual address") in a memory request, then the value of a counter associated with that entry is incremented. More specifically, in embodiments, when an entry in the data structure includes a virtual address (which may be referred to herein as a "first virtual address") that, when incremented by the respective prefetch stride for that entry, matches the second virtual address that is in the memory request, then a match is identified and the value of the counter for that entry is incremented.

In those embodiments, when the value of the counter for an entry satisfies a counter value threshold, then the lookahead amount for prefetch requests associated with that entry is increased. A prefetch request that is based on the new (larger) lookahead amount and that includes a third virtual address, which is the second virtual address incremented by the prefetch stride in the entry, can then be issued.

In embodiments, a second prefetch request that is based on the previous (smaller) lookahead amount and the third virtual address (the second virtual address incremented by the prefetch stride) is also issued, to avoid a gap in the prefetches for the load instruction.

In embodiments, the lookahead amount associated with an entry is increased each time the counter value for the entry satisfies the counter value threshold. For smaller loops, the lookahead amount increases but the amount of increase is limited by the size of the loop. That is, the lookahead amount for a smaller loop is self-governed by the number of times the threshold is satisfied. For larger loops and for loops that execute quickly, the lookahead amount can continue to increase to a relatively large amount, but can be limited depending on the size of the cache into which the data is prefetched, or depending on the number of prefetches needed to account for the access latency, for example.

Thus, in embodiments according to the present invention, a larger lookahead amount is determined and applied in larger loops where it can be beneficial, without reducing performance for smaller loops.

These and other objects and advantages of the various embodiments according to the present invention will be recognized by those of ordinary skill in the art after reading the following detailed description of the embodiments that are illustrated in the various drawing figures.

This summary contains, by necessity, simplifications, generalizations, and omissions of detail; consequently, those skilled in the art will appreciate that this summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF DRAWINGS

The accompanying drawings, which are incorporated in and form a part of this specification and in which like numerals depict like elements, illustrate embodiments according to the present invention and, together with the detailed description, serve to explain the principles of the invention.

DETAILED DESCRIPTION

Reference will now be made in detail to the various embodiments according to the present invention, examples of which are illustrated in the accompanying drawings. While described in conjunction with these embodiments, it will be understood that they are not intended to limit the invention to these embodiments. On the contrary, the disclosure is intended to cover alternatives, modifications and equivalents, which may be included within the spirit and scope of the disclosure as defined by the appended claims.

Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "sending," "generating," "determining," "accessing," "selecting," "reading," "comparing," "performing," "processing," "loading," "storing," "identifying," "replacing," "removing," "fetching," "prefetching," "indexing," "incrementing," "increasing," "issuing," "resetting," "updating," or the like, refer to actions and processes (e.g., the flowchart 400 of FIG. 4) of a computing system or similar electronic computing device or processor (e.g., the computing systems 100 and 200 of FIGS. 1 and 2, respectively). A computing system or similar electronic computing device manipulates and transforms data represented as physical (electronic) quantities within the computing system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), dynamic RAM, (DRAM), caches, read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

As used herein, a memory request is a type of operation that accesses memory. More specifically, a memory request refers to an instruction, message, or command for information (e.g., a block of data) from a memory (e.g., a cache or main memory). A block of data, or data block, may also be referred to herein as an instance of data or simply as data. A memory request may be a read/load operation to request a copy of a data block. These are examples only, and embodiments according to the present invention are not so limited.

In a virtual memory scheme, memory requests associated with the program instructions (e.g., load instructions) being executed by a central processing unit (CPU) refer to virtual addresses within a virtual address space. In general, a load instruction in an executing application can generate multiple memory requests to different addresses (virtual addresses) in memory.

Figure 1:
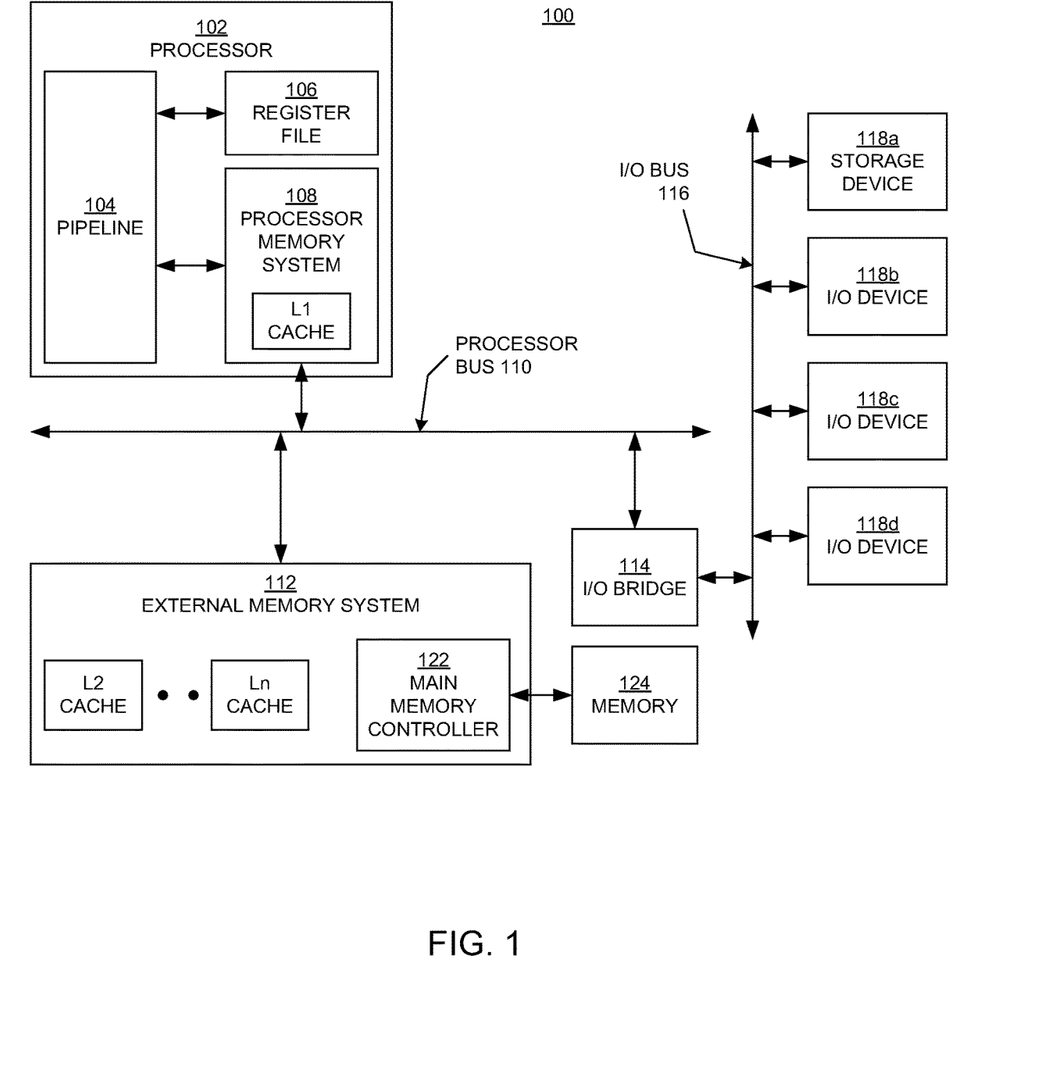
FIG. 1 is a block diagram illustrating an example of a computing system platform upon which embodiments according to the present invention can be implemented.

FIG. 1 is a block diagram illustrating an example of a computing system 100 upon which embodiments according to the present invention can be implemented. The system 100 includes at least one processor 102, which can be a single CPU or one of multiple processor cores of a multi-core architecture (e.g., see the example of FIG. 2). In the FIG. 1 example, the processor 102 includes a pipeline 104, one or more register files 106, and a processor memory system 108. The processor memory system 108 includes circuitry that implements a memory request manager for managing memory requests, also referred to as a prefetcher.

The processor 102 is connected to a processor bus 110, which enables communication with an external memory system 112 and an input/output (I/O) bridge 114. The I/O bridge 114 enables communication over an I/O bus 116 with various different I/O devices including, for example, a storage device 118a and other I/O devices 118b, 118c, and 118d (e.g., a network interface, display adapter, and/or user input devices such as a keyboard or mouse). The storage device 118a, such as a disk drive or other large capacity (typically nonvolatile) storage device, can also serve as secondary storage for the main memory 124 in a virtual memory scheme.

In the example computing system 100, the processor memory system 108 and external memory system 112 together form a hierarchical cache system, including at least a first level (L1) cache within the processor memory system, and any number of higher level caches (L2, . . . , Ln) within the external memory system. The highest level cache within the external memory system 112 (which may be the L2 cache if there are only two levels in the hierarchy) is the Ln cache, which is located closer to the memory module (main memory) 124 than the other caches. The prefetcher can be configured to prefetch cache lines from any level of the memory hierarchy or from the main memory 124 to a lower level in the memory hierarchy including, in some embodiments, to the L1 cache within the processor 102.

The distribution of caches within the processor memory system 108 and the external memory system 112 may be different in other implementations. For example, the L1 cache and the L2 cache can both be internal to the processor 102, and the L3 cache (and higher level caches) can be external to the processor 102. If the processor 102 is a multi-core processor, each core can have its own internal L1 cache, and the cores can share an L2 cache (see the examples of FIG. 2).

In the FIG. 1 example, the external memory system 112 also includes a main memory controller 122, which is connected to any number of memory modules (e.g., dynamic random access memory, DRAM, modules) that serve as the main memory 124.

Figure 2:
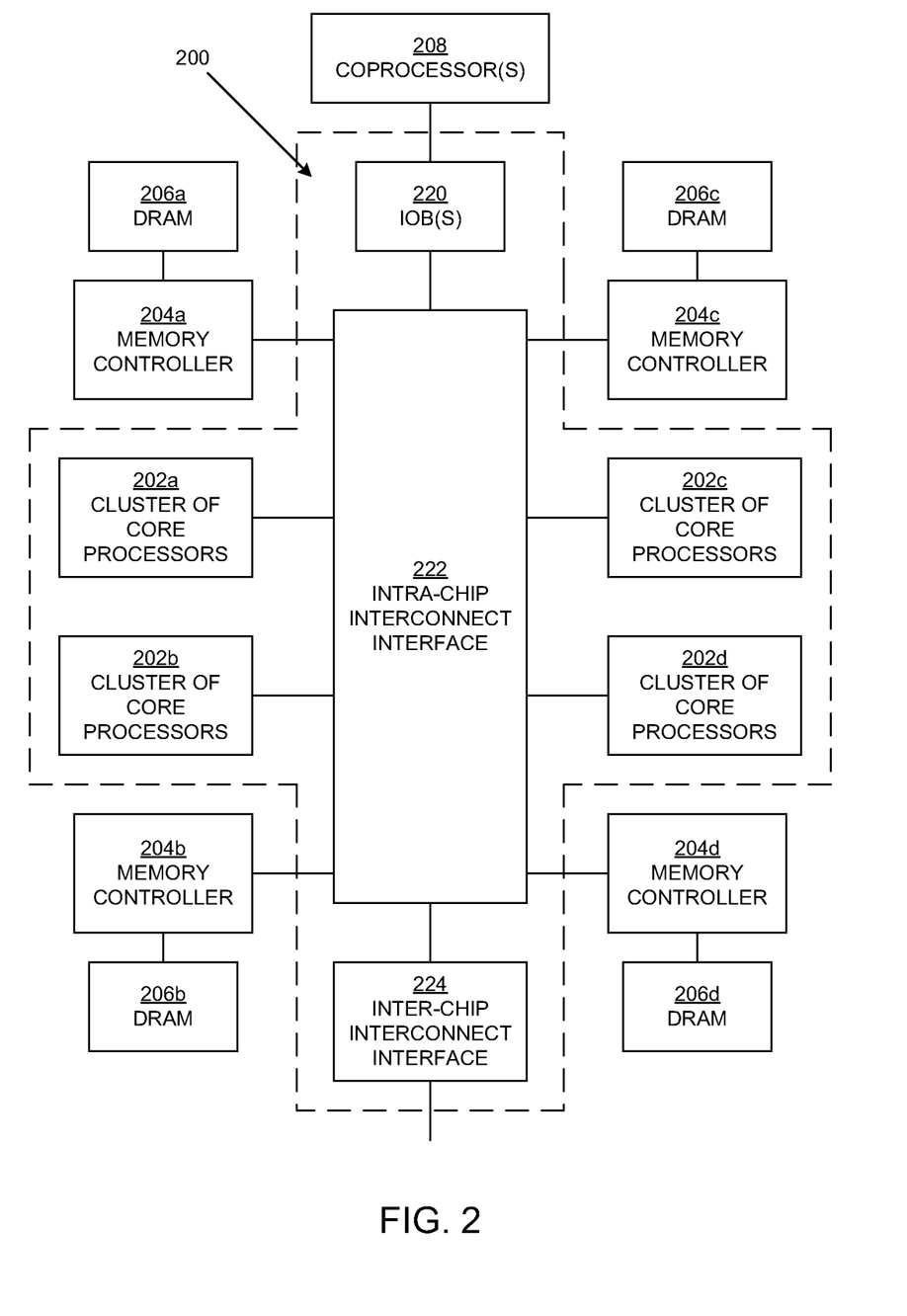
FIG. 2 is a block diagram illustrating another example of a computing system platform upon which embodiments according to the present invention can be implemented.

FIG. 2 is a block diagram illustrating another example of an architecture of a computing system 200 (e.g., a chip) upon which embodiments according to the present invention can be implemented. In the example architecture of FIG. 2, the system 200 includes a number of core processors or CPUs. In an embodiment, the core processors are arranged in multiple clusters 202a, 202b, 202c, and 202d (202a-d), which may be referred to herein individually as the cluster 202 or collectively as the clusters 202. While four clusters are shown, embodiments according to the present invention are not so limited.

The clusters 202 are coupled to one or more local memory controllers 204a, 204b, 204c, and 204d (204a-d). The memory controllers 204a-d are each configured to enable access to an external (or attached) memory (the main memory). The main memory may include multiple DRAMs 206a, 206b, 206c, and 206d, with each DRAM coupled to a respective memory controller. While four memory controllers and four DRAMs are shown in FIG. 2, embodiments according to the invention are not so limited.

In embodiments, each core processor in the clusters 202 includes circuitry that implements a prefetcher. The prefetcher can be configured to prefetch cache lines from any level of the memory hierarchy or from the main memory to a lower level in the memory hierarchy including the L1 cache.

In embodiments, one or more coprocessors 208 are each coupled to the clusters 202 through a respective I/O bridge (IOB) 220. A coprocessor 208 may include, for example an I/O device, a compression/decompression processor, a hardware accelerator, a Peripheral Component Interconnect Express (PCIe) bus, or the like. Each coprocessor 208 can be configured to store data in, or load data from, the caches 208 and 210 in a cluster 202. A coprocessor 208 can also be configured to send, or assign, processing tasks to the clusters 202 (e.g., to core processors in the clusters). Accordingly, in an embodiment, the system 200 includes an intra-chip interconnect interface 222 that includes buses and is configured to couple the coprocessor 208 to the clusters 202, and is also configured to couple the coprocessor and the clusters to the memory controllers 204a-d. The coprocessor 208 can also be configured to receive data or processing tasks from other components such as other systems (e.g., chips), which may be like the system 200. Accordingly, in an embodiment, the system 200 also includes an inter-chip interconnect interface 224 that includes buses and channels and is configured to couple the system 200 to other systems. Thus, the system 200 is configured to exchange data and processing tasks with other systems.

In the discussion to follow, terms such as "first" and "second" are used only as modifiers to distinguish between elements that have the same name and do not necessarily imply an order or ranking, except as noted or apparent according to the context of their use.

In overview, in embodiments according to the present invention, multiple memory requests associated with a load instruction may be generated, accessed, or received. Each memory request includes an address (a virtual address) that is translated to a physical address for the physical location where the data that is the objective of the memory request is stored. In response to a memory request, a prefetcher accesses a data structure (e.g., a table) in computer system memory. The data structure stores a listing of active prefetches. Each entry in the data structure includes a respective virtual address and a respective prefetch stride for a corresponding prefetch. If the virtual address of a memory request (e.g., a request to load or fetch data) matches an entry in the data structure, then the value of a counter associated with that entry is incremented. If the value of the counter satisfies a threshold, then the lookahead amount associated with the memory request is increased.

FIGS. 3A, 3B, 3C, and 3D (3A-3D) illustrate examples of a data structure 300 (e.g., a table) in computer system memory that stores a listing of active prefetches in embodiments according to the present invention. The data structure 300 may be referred to as a stream table. Examples of a stream table and methods for generating a stream table are described in U.S. Pat. No. 10,013,357; however, the present invention is not limited to or by those examples.

An active prefetch refers to a prefetch that is associated with an active (e.g., executing) load instruction. The data structure 300 may store information in addition to what is shown and/or described herein, and its listing of prefetches may also include inactive prefetches.

In the examples of FIGS. 3A-3D, the data structure 300 includes three entries 301, 302, and 303 (301-303); however, the data structure can include any number of entries. Each entry corresponds to a stream of memory requests: the entry 301 corresponds to a stream A, the entry 302 corresponds to a stream B, and the entry 303 corresponds to a stream C. Each stream can include multiple memory requests; each stream is essentially a sequence of memory requests.

Each of the entries 301-303 includes a respective virtual address and a respective prefetch stride. Each prefetch stride is the distance between two successive virtual addresses in a prefetch pattern. The prefetch strides in the entries 301-303 are determined based on respective prefetch patterns previously detected by the prefetcher in respective streams of memory requests.

In embodiments according to the present invention, a counter value is associated with each of the entries 301-303. The counter value may be stored in the data structure 300, or it may be stored in another data structure associated with the data structure 300. The counter value associated with each entry is initialized with a value of one when the entry is created, and is incremented (increased by a value of one) each time a prefetch request associated with the entry is issued, as will be further described in the example discussed below. A maximum value can be specified for the counter value so that, if the counter value reaches that maximum value, it is not incremented further (it remains equal to the maximum value). The maximum value can be based on, for example, the size of the cache into which the data is prefetched or the number of prefetches needed to account for the access latency.

In embodiments according to the present invention, a threshold is associated with the counter value. In an embodiment, the counter value threshold is three.

In embodiments according to the present invention, a lookahead amount or prefetch distance is associated with each of the entries 301-303. The lookahead amount may be stored in the data structure 300, or it may be stored in another data structure associated with the data structure 300. The lookahead amount is the number of cache lines that are prefetched per prefetch request. The lookahead amount associated with each entry is initialized with a value of one, and is increased (e.g., incremented by a value of one) each time the counter value associated with the entry satisfies (e.g., reaches, exceeds) the counter value threshold.

More specifically, in embodiments, the counter value threshold has a value of N (where N is an integer), the lookahead amount is COUNT/N+1, where COUNT is the counter value; and whenever COUNT % N is true (COUNT % N==0, where % represents modulo), the lookahead amount is increased.

In general, VA(p)=LA*S+VA(d) [Eq. (1)], where VA(p) is the virtual address for a prefetch, and where LA is the lookahead amount, S is the prefetch stride, and VA(d) is the virtual address in the entry associated with the prefetch in the data structure 300.

In the following example, only the entry 301 is discussed. However, the discussion applies equally to the other entries in the data structure 300. In the example, a prefetcher that monitors a sequence of memory requests in the stream A has identified a pattern in the sequence, and so has also determined a prefetch distance SA for the stream. In the example, the virtual addresses A1, A2, A3, A4, etc., are part of the pattern of virtual addresses for the stream A; data at the virtual address A1 is retrieved in response to a memory request; and data at virtual addresses A2, A3, A4, etc., is to be subsequently prefetched in turn.

The example begins with the memory request for the data at the virtual address A1. As noted above, the prefetcher has already identified a prefetch stride SA for the stream A, and so a first prefetch request is also issued to fetch the data at the virtual address A2, which is equivalent to the virtual address A1 incremented by the prefetch stride SA.

Figure 3A:
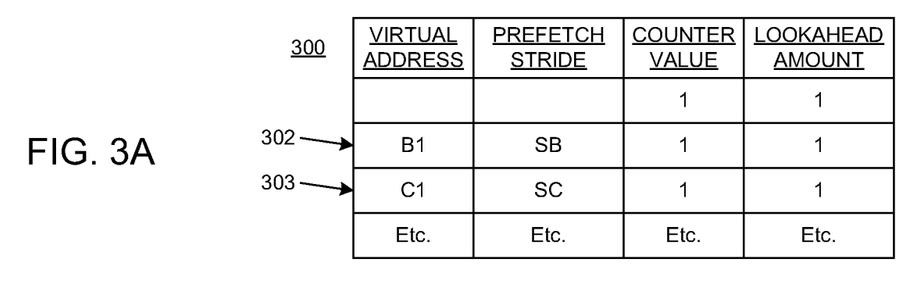
FIGS. 3A, 3B, 3C, and 3D illustrate examples of a data structure in computer system memory that stores a listing of active prefetches in embodiments according to the present invention.

FIG. 3A shows the state of the data structure 300 before the first prefetch request for the stream A. The data structure 300 may include entries for other stream as shown, but in this example does not yet include an entry for the stream A.

Figure 3B:
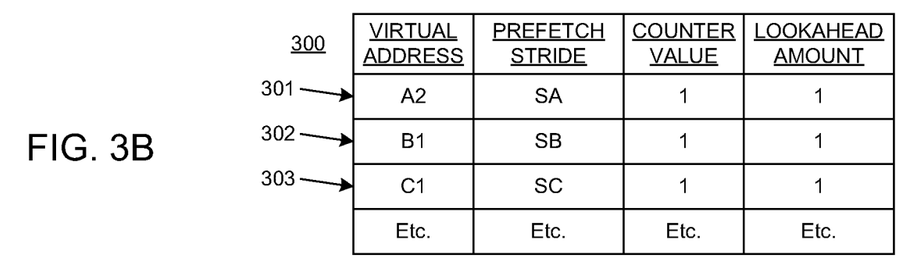

FIG. 3B shows the state of the data structure 300 after the first prefetch request for the stream A. As a result of that first prefetch request, the entry 301 is added to the data structure 300. The entry 301 includes the virtual address A2 and the prefetch distance SA associated with the first prefetch request. The counter value for the entry 301 is incremented by one count when the first prefetch request is issued, and so has a value of one. The lookahead amount remains at its initial value of one.

Figure 3C:
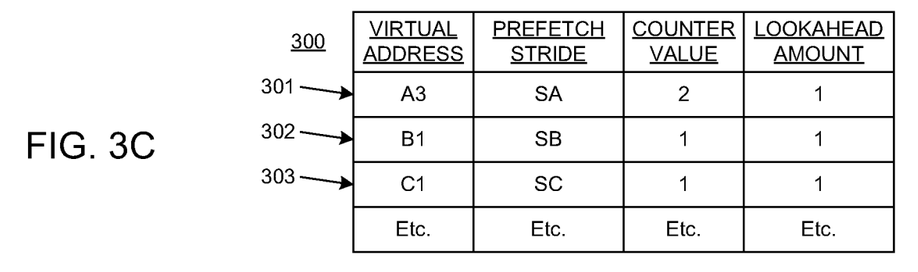

FIG. 3C shows the state of the entry 301 after being updated by a second prefetch request for data at the virtual address A3, which is equivalent to the virtual address A2 incremented by the prefetch stride SA. The entry 301 is updated to include the virtual address A3 in place of the virtual address A2. The counter value for the entry 301 is again incremented by one count when the second prefetch request is issued, and so has a value of two. The lookahead amount remains at its initial value, and the prefetch stride SA remains the same.

Figure 3D:
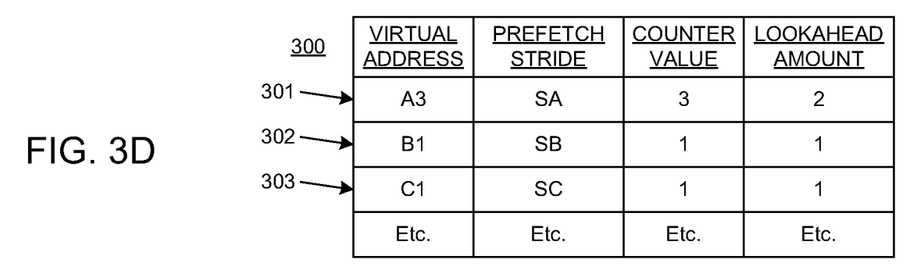

FIG. 3D shows the state of the entry 301 after being updated by a third prefetch request for data at the virtual address A4, which is equivalent to the virtual address A3 incremented by the prefetch stride SA. The entry 301 is updated to include the virtual address A4 in place of the virtual address A3. The counter value for the entry 301 is again incremented by one count when the third prefetch request is issued, and so has a value of three.

In this example, the counter value threshold has a value of three. Thus, in this example, the counter value after the third prefetch request satisfies the threshold. Accordingly, the lookahead amount is increased as shown in FIG. 3D. In this example, the lookahead amount is incremented by a value of one each time the threshold is satisfied. More specifically, in this example, the lookahead amount is COUNT/3+1, and whenever COUNT %3==0, the lookahead amount is increased.

The lookahead amount is increased as just described each time the counter value threshold is satisfied. For smaller instruction (software) loops, the lookahead amount increases but the amount of increase is limited by the size of the loop. That is, the lookahead amount for a smaller loop is self-governed by the number of times the threshold is satisfied. For larger loops and loops that execute quickly, the lookahead amount can continue to increase to a relatively large amount, but can be limited by specifying a maximum value for the counter value, depending on the size of the cache into which the data is prefetched, or depending on the number of prefetches needed to account for the access latency, for example.

Figure 4:
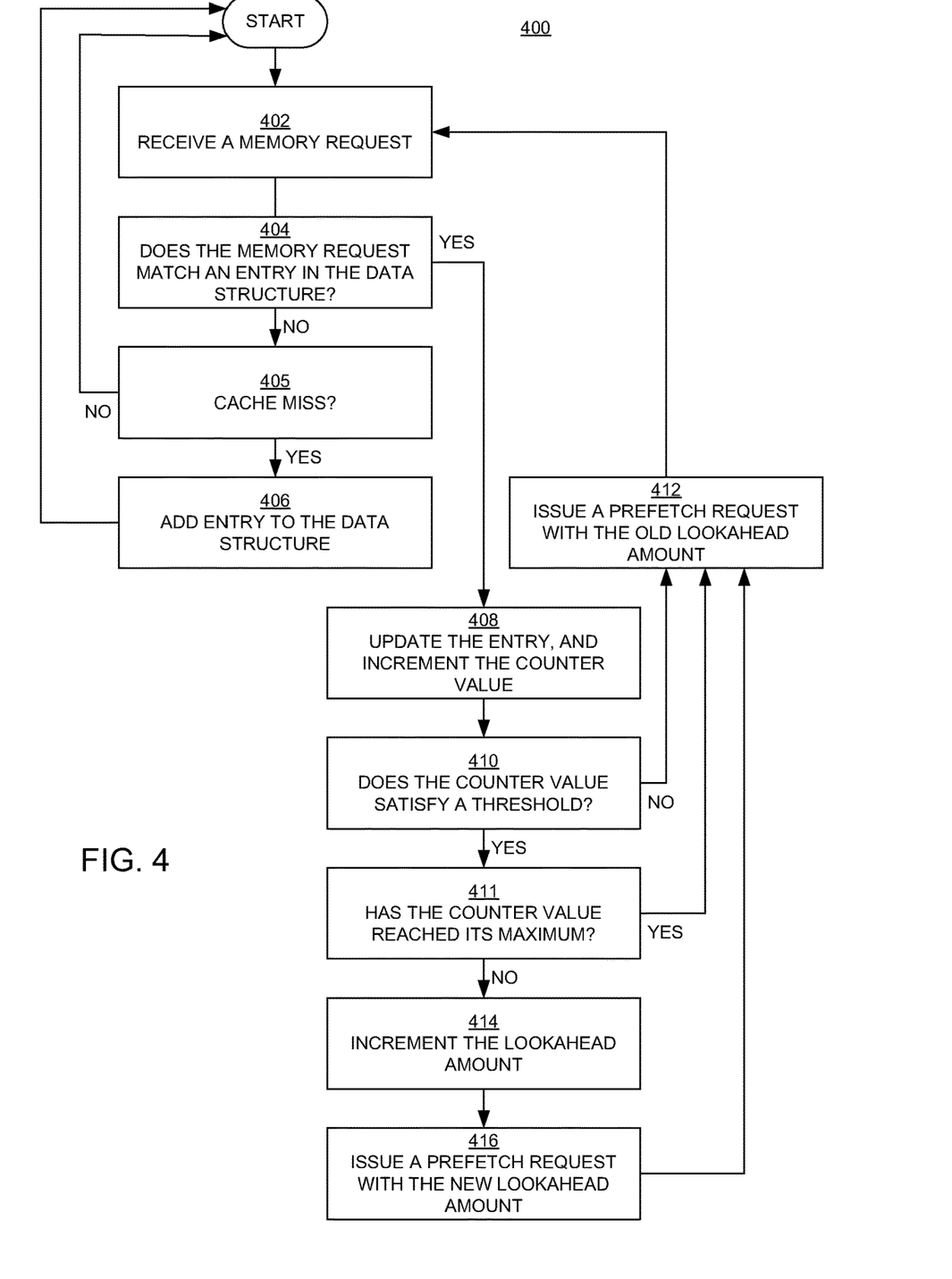
FIG. 4 is a flowchart of examples of operations in computer-implemented methods for prefetching data in embodiments according to the present invention.

FIG. 4 is a flowchart 400 of examples of operations in computer-implemented methods for prefetching data in embodiments according to the present invention. The operations in the flowchart 400 can be performed in and by the computing systems 100 and 200 of FIGS. 1 and 2, respectively. The operations in the flowchart 400 do not necessarily need to be performed in the order in which they are shown and described.

In block 402 of FIG. 4, a memory request is received or accessed by the prefetcher. The memory request may be, for example, any memory request in a stream of memory requests.

In embodiments, each memory request is checked against a data structure (e.g., the data structure 300 of FIGS. 3A-3D). In block 404, a determination is made with regard to whether the memory request includes information that matches an entry in the data structure. More specifically, in an embodiment, a determination is made with regard to whether the memory request includes a second virtual address (e.g., A3) that matches an entry in the data structure, where that entry includes a first virtual address (e.g., A3) and a prefetch stride (e.g., SA) such that the second virtual address matches the first virtual address incremented by the prefetch stride (e.g., A3=A2+SA).

If the memory request does not match (correspond to) an entry in the data structure, then the flowchart 400 proceeds to block 405; otherwise, the flowchart proceeds to block 408.

In block 405, a determination is made with regard to whether the memory request results in a cache miss. If not, then the flowchart 400 returns to the start. If so, then the flowchart 400 proceeds to block 406.

In block 406, an entry corresponding to the memory request is added to the data structure. In an embodiment, the entry includes the virtual address that is in the memory request (e.g., A3) and a prefetch stride (e.g., SA) associated with the memory request.

In an embodiment, the prefetch stride is determined by the prefetcher by monitoring previous memory requests associated with a stream of memory requests as previously described herein.

In an embodiment, the entry is initialized with a counter value of one and with a lookahead amount of one.

From block 406, the flowchart 400 returns to the start.

In block 408, when the memory request matches (corresponds to) an entry in the data structure as determined in block 404, then that entry is updated to include the virtual address included in the memory request (e.g., A3) in place of the address that was in the entry (e.g., A2), as shown in FIG. 3C, for example. Also, the counter value associated with that entry is incremented.

In block 410, a determination is made with regard to whether the counter value satisfies a counter value threshold. If the counter value does not satisfy the threshold, then the flowchart 400 proceeds to block 411; otherwise, the flowchart proceeds to block 412.

In block 411, a determination is made with regard to whether the counter value has reached its maximum value. If so, then the flowchart 400 proceeds to block 412. If not, then the flowchart 400 proceeds to block 414.

In block 412, a prefetch request is issued for data at the new virtual address (e.g., A3) and the current lookahead amount (e.g., one; LA=1 in Eq. (1)). That is, the lookahead amount associated with the entry is not changed.

From block 412, the flowchart 400 returns to the start.

In block 414, the lookahead amount associated with the entry is increased as described above.

In block 416, a prefetch request is issued for data at the new virtual address (e.g., A3) and with the increased lookahead amount (e.g., two; LA=2 in Eq. (1)). From block 416, the flowchart 400 proceeds to block 412.

As mentioned above, in block 412, a prefetch request is issued for data at the new virtual address (e.g., A3) and the old lookahead amount (the lookahead amount before it was increased in block 414, e.g., one). This second prefetch request is issued because increasing the lookahead amount can create a gap in the stream of prefetch requests. This gap is filled by issuing the extra prefetch request at the old lookahead amount.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The example methods described and/or illustrated herein may also omit one or more of the steps described or illustrated herein or include additional steps in addition to those disclosed.

In summary, embodiments according to the present invention introduce adaptive prefetching, during which the lookahead amount is intelligently adjusted (e.g., increased) when it is beneficial to do so. Also, the amount of increase is managed, so that the lookahead amount does not get too large. Accordingly, the lookahead amount can be smaller for shorter software loops and larger for longer software loops.

In embodiments, the lookahead amount is increased each time a threshold is satisfied. For smaller loops, the lookahead amount increases but the amount of increase is limited by the size of the loop. That is, the lookahead amount for a smaller loop is self-governed by the number of times the threshold is satisfied. For larger loops and loops that execute quickly, the lookahead amount can continue to increase to a relatively large amount, but can be limited depending on the size of the cache into which the data is prefetched, or depending on the number of prefetches needed to account for the access latency, for example.

Thus, in embodiments according to the present invention, a larger lookahead amount is determined and applied in larger loops where it can be beneficial, without reducing performance for smaller loops.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

Although the subject matter has been described in language specific to structural features and/or methodological acts, it is to be understood that the subject matter defined in the disclosure is not necessarily limited to the specific features or acts described above. Rather, the specific features and acts described above are disclosed as example forms of implementing the present invention.

Embodiments according to the invention are thus described. While the present invention has been described in particular embodiments, it should be appreciated that the invention should not be construed as limited by such embodiments, but rather construed according to the following claims.

What is claimed is:

1. A computer-implemented method of prefetching, the computer-implemented method comprising:
   in response to a memory request to load data from a second virtual address, accessing a data structure comprising a plurality of entries, each entry of the plurality of entries associated with a respective prefetch;
   determining whether the memory request corresponds to any entry in the data structure, the entry comprising a first virtual address and a prefetch stride;
   when the memory request corresponds to an entry in the data structure, incrementing a value of a counter associated with the entry and then determining whether the value of the counter satisfies a threshold; and
   issuing a first prefetch request comprising the second virtual address incremented by the prefetch stride and also comprising a lookahead amount, wherein the lookahead amount is a first lookahead amount if the value of the counter does not satisfy the threshold, wherein the lookahead amount is a second lookahead amount if the value of the counter satisfies the threshold, and wherein the second lookahead amount is greater than the first lookahead amount.

2. The computer-implemented method of claim 1, further comprising issuing a second prefetch request comprising the first lookahead amount and the second virtual address incremented by the prefetch stride.

3. The computer-implemented method of claim 1, wherein the threshold is three.

4. The computer-implemented method of claim 1, wherein the threshold has a value of N, wherein N is an integer, and the lookahead amount is COUNT/N+1, wherein the COUNT is the value of the counter, and wherein when the COUNT modulo N is true, the lookahead amount is increased.

5. The computer-implemented method of claim 1, further comprising, when the memory request does not correspond to said any entry in the data structure, then adding an entry to the data structure comprising information corresponding to the memory request, the information comprising the second virtual address and a prefetch stride associated with the memory request.

6. The computer-implemented method of claim 1, wherein the lookahead amount is increased each time the threshold is satisfied.

7. The computer-implemented method of claim 6, further comprising incrementing the lookahead amount by a value of one, each time the threshold is satisfied.

8. The computer-implemented method of claim 1, further comprising updating the entry to include the second virtual address in place of the first virtual address.

9. A system, comprising:
   a processor;
   a memory coupled to the processor; and
   a cache coupled to the memory;
   wherein the processor is operable for executing instructions that, when executed, perform operations comprising:
      accessing a memory request in a stream of memory requests, the memory request to load data at a second virtual address into the cache;
      accessing a data structure comprising a plurality of entries, each entry of the plurality of entries comprising a respective virtual address and a respective prefetch stride;
      identifying an entry in the data structure comprising a first virtual address that, when incremented by the respective prefetch stride, matches the second virtual address;
      incrementing a value of a counter associated with the entry;
      determining that the value of the counter satisfies a threshold;
      in response to said determining, increasing a lookahead amount associated with the stream from a first lookahead amount to a second lookahead amount; and
      issuing a first prefetch request comprising the second virtual address incremented by the respective prefetch stride and also comprising the second lookahead amount.

10. The system of claim 9, wherein the operations further comprise issuing a second prefetch request comprising the first lookahead amount and the second virtual address incremented by the respective prefetch stride.

11. The system of claim 9, wherein the threshold is three.

12. The system of claim 9, wherein the threshold has a value of N, (wherein N is an integer, and the lookahead amount is COUNT/N+1, wherein the COUNT is the value of the counter and wherein when the COUNT modulo N is true, the lookahead amount is increased.

13. The system of claim 9, wherein the lookahead amount is increased each time the threshold is satisfied.

14. The system of claim 9, wherein the operations further comprise updating the entry to include the second virtual address in place of the first virtual address.

15. A system comprising a prefetcher for prefetching, the prefetcher comprising:
   means for determining, in response to a memory request that comprises a second virtual address, whether a data structure in a memory comprises an entry comprising a first virtual address and a prefetch stride, wherein the first virtual address incremented by the prefetch stride is equivalent to the second virtual address;
   means for incrementing a value of a counter associated with the entry when the data structure comprises the entry;
   means for determining whether the value of the counter satisfies a threshold; and
   means for issuing a first prefetch request comprising the second virtual address incremented by the prefetch stride and also comprising a lookahead amount, wherein the lookahead amount is a first lookahead amount if the value of the counter does not satisfy the threshold, wherein the lookahead amount is a second lookahead amount if the value of the counter satisfies the threshold, and wherein the second lookahead amount is greater than the first lookahead amount.

16. The system of claim 15, wherein the prefetcher further comprises means for issuing a second prefetch request comprising the first lookahead amount and the second virtual address incremented by the prefetch stride.

17. The system of claim 15, wherein the threshold is three.

18. The system of claim 15, wherein the prefetcher further comprises means for adding an entry to the data structure when the memory request does not correspond to any entry in the data structure.

19. The system of claim 15, wherein the prefetcher further comprises means for increasing the lookahead amount each time the threshold is satisfied.

20. The system of claim 15, wherein the prefetcher further comprises means for updating the entry to include the second virtual address in place of the first virtual address.

\* \* \* \* \*